United States Patent
Booz et al.

(10) Patent No.: US 6,471,017 B1
(45) Date of Patent: Oct. 29, 2002

(54) MAGNETIC BRAKE AND ELECTROMECHANICAL BRAKING DEVICE WITH A MAGNETIC BRAKE

(75) Inventors: Othmar Booz; Georg Koepff, both of Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,400

(22) PCT Filed: Aug. 11, 1998

(86) PCT No.: PCT/DE98/02302

§ 371 (c)(1),
(2), (4) Date: Jul. 7, 2000

(87) PCT Pub. No.: WO99/28648

PCT Pub. Date: Jun. 10, 1999

(30) Foreign Application Priority Data

Nov. 27, 1997 (DE) .......................... 197 52 543

(51) Int. Cl.[7] ............................................. F16D 55/08
(52) U.S. Cl. .................... 188/72.7; 188/162; 192/84.31
(58) Field of Search ................ 188/72.1, 72.7, 188/161, 162, 163, 164, 171, 69, 68, 156, 158; 192/66.1, 34, 83, 84.1, 84.2, 84.3, 84.31; 310/76, 93

(56) References Cited

U.S. PATENT DOCUMENTS

| | | | | |
|---|---|---|---|---|
| 2,876,397 A | * | 3/1959 | Wasson | 317/171 |
| 3,224,540 A | * | 12/1965 | Straub | 192/90 |
| 3,400,797 A | * | 9/1968 | Horn et al. | 192/84 |
| 3,512,618 A | * | 5/1970 | Schafer | 188/161 |
| 3,534,307 A | * | 10/1970 | Spewock et al. | 335/170 |
| 3,763,968 A | * | 10/1973 | Noly | 188/171 |
| 3,896,925 A | * | 7/1975 | Mitsui et al. | 198/232 |
| 4,033,435 A | * | 7/1977 | Bayliss | 188/173 |
| 4,237,439 A | * | 12/1980 | Nemoto | 335/230 |
| 4,430,592 A | * | 2/1984 | Manktelow | 310/93 |
| 4,556,858 A | * | 12/1985 | Koehler | 335/234 |
| 4,606,444 A | * | 8/1986 | Sekella | 192/48.2 |
| 4,809,824 A | * | 3/1989 | Fargier et al. | 188/72.8 |
| 5,014,828 A | * | 5/1991 | Baldassare | 188/173 |
| 5,057,728 A | * | 10/1991 | Dammeyer et al. | 310/77 |
| 5,125,483 A | * | 6/1992 | Kitagawa et al. | 188/158 |
| 5,199,532 A | * | 4/1993 | Suganama et al. | 187/80 |
| 5,375,684 A | * | 12/1994 | Ben Asher et al. | 188/353 |
| 5,490,583 A | * | 2/1996 | Anderson et al. | 188/161 |
| 5,620,077 A | * | 4/1997 | Richard | 192/120 |
| 5,829,557 A | * | 11/1998 | Halasy-Wimmer et al. | 188/162 |
| 5,847,478 A | * | 12/1998 | Usui et al. | 310/76 |
| 5,931,268 A | * | 8/1999 | Kingston et al. | 188/162 |
| 5,957,551 A | * | 9/1999 | Maron et al. | 303/191 |
| 5,961,190 A | * | 10/1999 | Brandmeier et al. | 303/152 |
| 6,189,661 B1 | * | 2/2001 | Schaffer | 188/157 |
| 6,202,804 B1 | * | 3/2001 | Dropmann et al. | 188/171 |
| 6,203,116 B1 | * | 3/2001 | Dieckmann | 303/20 |
| 6,213,256 B1 | * | 4/2001 | Schaffer | 188/71.9 |

FOREIGN PATENT DOCUMENTS

DE    19604946 A 1    *  8/1997  .................. 303/191

* cited by examiner

*Primary Examiner*—Jack Lavinder
*Assistant Examiner*—Benjamin A. Pezzlo
(74) *Attorney, Agent, or Firm*—Ronald E. Greigg

(57) ABSTRACT

The invention relates to a preferably bistable magnetic brake, which is intended in particular for locking an actuating device of an electromechanical wheel braking device in its braking position at a given time. To enable releasing the magnetic brake even in the event of a defect, the invention proposes embodying the magnetic brake with two redundant electromagnets for its actuation.

6 Claims, 2 Drawing Sheets

MAGNETIC BRAKE AND ELECTROMECHANICAL BRAKING DEVICE WITH A MAGNETIC BRAKE

BACKGROUND OF THE INVENTION

1. Field of the Invention

Figure 1:
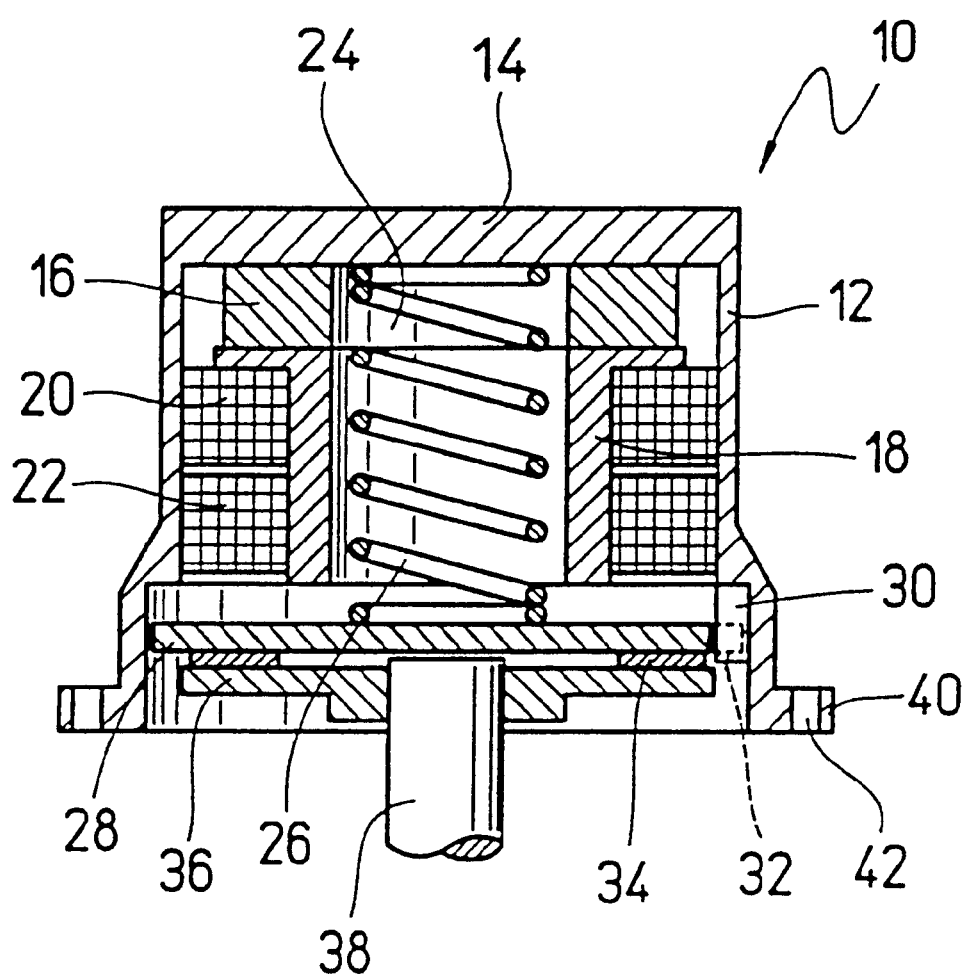

The invention relates to an magnetic brake and more particularly to an improved electromechanical braking device especially useful for motor vehicles.

2. Description of the Prior Art

One such magnetic brake is known from U.S. Pat. No. 5,185,542. The known magnetic brake has one rotatable part and one rotationally fixed part, which are in frictional or positive engagement with one another in a braking position of the magnetic brake, so that the rotatable part is held or at least braked by the rotationally fixed part, and which in a released position of the magnetic brake are free of one another, so that the rotatable part is freely rotatable. For actuation, the known magnetic brake has a spring element, which presses the rotationally fixed part or the rotatable part against the respectively other part, as well as an electromagnet, which by being supplied with current disconnects the rotatable part and the rotationally fixed part from one another counter to the force of a spring element; that is, the spring element puts the magnetic brake in its braking position and keeps it there, and the magnetic brake can be released by means of the electromagnet. It is equally possible to put a magnetic brake into the braking position by supplying current to the electromagnet, while conversely a spring element releases the magnetic brake.

The magnetic brake has the disadvantage that in the event of a defect, or in other words if its electromagnet or its power supply fails, it cannot be actuated.

ADVANTAGES OF THE INVENTION

The magnetic brake of the invention as defined by the characteristics of claim 1 has a second electromagnet, with which it is actuatable. The magnetic brake of this invention is advantageous because it has a magnetic brake that is actuatable selectively by its first or second electromagnet; the two electromagnets are redundant. This has the advantage of high operational reliability of the magnetic brake of the invention; failure is virtually precluded.

Preferably, the two electromagnets are each connected to their own, mutually independent power supplies, so that there is also redundance in terms of the power supply for actuating the magnetic brake, which further reduces the likelihood of failure of the magnetic brake (claim 2).

In a preferred feature of the electromechanical wheel braking device, the magnetic brake is embodied in bistable form (claim 3); that is, it remains both in the released position and in the braking position without current being supplied to its electromagnets. The electromagnets serve to switch the magnetic brake over from the released position to the braking position and conversely from the braking position into the released position. For the switchover between the two positions, only a brief supply of current selectively to the first or the second electromagnet is necessary. The bistable embodiment of the magnetic brake can be done for instance with the aid of a permanent magnet, which keeps the magnetic brake in one of its two positions counter to the force of a spring element, while conversely, after the switchover by means of one of its two electromagnets, the magnetic brake is kept in the other position counter to the force of the permanent magnet by the spring element; the force of the permanent magnet in this other position of the magnetic brake is weakened by an air gap, caused by the switchover, in its magnetic circuit.

In a feature of the invention in accordance with claim 4, the magnetic brake is part of an electromechanical braking device for a motor vehicle; it serves to lock the electromechanical braking device in the actuated position, so that a braking force generated with the braking device is kept constant, without current being supplied to the electromechanical braking device. Supplying current to the electromechanical braking device is necessary solely to generate or boost the braking force and/or to reduce the braking force, which is understood also to mean a complete release of the electromechanical braking device. The electromechanical braking device can as a result be used as a parking brake, which once a braking force has been brought to bear maintains it without current being supplied. The electromechanical braking device can also be locked during a braking event with constant braking force using the magnetic brake, so that the braking force is maintained without current being supplied to the braking device. Only in order to vary the braking force is the magnetic brake switched into its released position and is current supplied to the braking device in such a way that its braking force varies in the desired way. In a preferred feature, the electromechanical braking device is embodied in non-self-locking fashion; that is, it releases itself when there is no current to the electric motor and the magnetic brake is released, because of a reaction force to the contact pressure force with which its friction brake linings are pressed against a brake body, such a brake disk or a brake drum, except for a negligible residual braking force. This feature of the invention has the advantage that the electromechanical braking device can be released in every case, because of the redundance of the magnetic brake, even if its electric motor or its power supply fails. It is therefore unnecessary to provide a second electric motor to release the electromechanical braking device in the event of a defect. The expense for enabling the release of the electromechanical braking device even in the event of a defect is minimal; it is limited to the provision of a second electromagnet for the magnetic brake.

DRAWING

FIG. 1, an axial section through a magnetic brake of the invention; and

Figure 2:
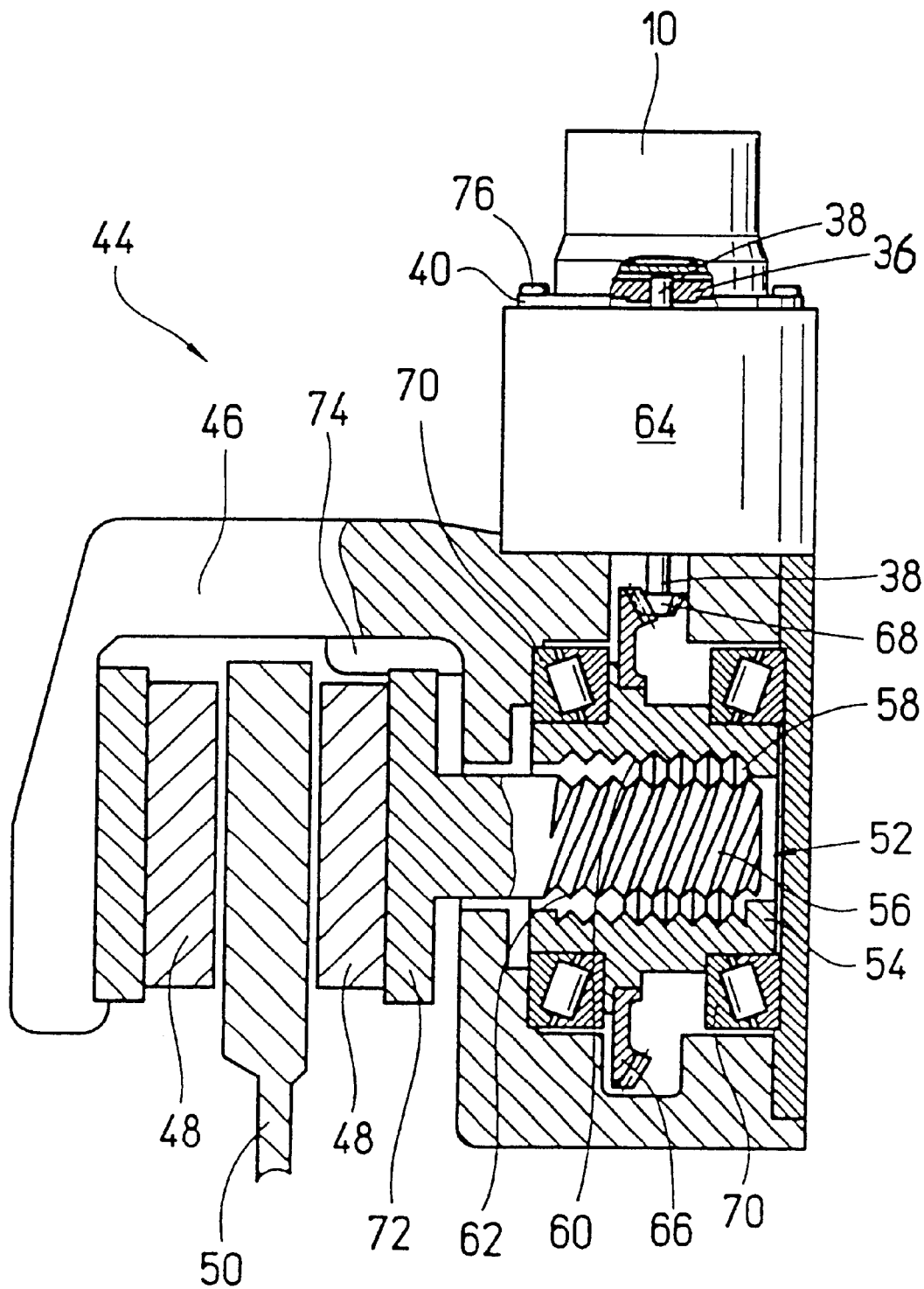

FIG. 2, an axial section through an electromechanical braking device according to the invention.

The two drawing figures, for the sake of clarity, are schematic illustrations of exemplary embodiments of the invention and are to different scales.

DESCRIPTION OF THE PREFERRED EMBODIMENTS

The magnetic brake 10 of the invention, shown in FIG. 1, has a cup-shaped housing 12 of ferromagnetic material. An annular permanent magnet 16 with axial magnetization is mounted concentrically in the housing 12, on a bottom 14 of the housing 12. In a continuation of the permanent magnet 16, a hollow-cylindrical magnet core 18 of ferromagnetic material is mounted concentrically with the housing 12 on the permanent magnet 16. Two annular magnet coils 20, 22 are slipped onto the magnet core 18, axially adjacent one another. The magnet coils 20, 22 are located in an annular interstice between the magnet core 18 and the housing 12. Each magnet coil 20, 22, together with the magnet core 18, forms one electromagnet 18, 20; 18, 22. A helical compression spring 26 is inserted as a spring element into a cylindrical interior 24 inside the hollow-cylindrical magnet core 18 and inside the annular permanent magnet 16; this spring is braced against the bottom 14 of the housing 12 and presses against an armature disk 28, which is disposed on a side, remote from the bottom 14, of the permanent magnet 16 and of the two electromagnets 18, 20; 18, 22 in the housing 12 of the magnetic brake 10. The armature disk 28 is joined to the housing 12 in an axially displaceable fashion but fixed against relative rotation by means of preferably a plurality of splines 30, which are distributed over the circumference of the housing 12 and extend longitudinally of the housing and are integral with the housing 12, and which protrude inward in the housing 12 and engage complimentary grooves 32 in the circumference edge of the armature disk 28. Only one pair of splines 30 and grooves 32 can be seen in the drawing.

On an end face of the armature disk 28 remote from the permanent magnet 16 and the two electromagnets 18, 20; 18, 22, a brake lining 34 in the form of an annular disk is fixedly mounted. A coupling disk 36 is disposed on the side of the brake lining 34 in the housing 12, on its open face end remote from the bottom 14. The coupling disk 36 is press-fitted for instance onto a shaft 38, coaxial with the housing 12, of an electric motor not shown in FIG. 1 and in this way is disposed rotatably in the housing 12 of the electromagnet 10.

The function of the magnetic brake 10 of the invention is as follows: The magnetic brake 10 has two stable positions, namely the braking position, shown in FIG. 1, and a release position, not shown, in which the armature disk 28 rests on an end face, toward it, of the two electromagnets 18, 20; 18, 22. In other words, the magnetic brake 10 is embodied in bistable form. In the braking position shown, the helical compression spring 26 presses the armature disk 28, which is axially movable in the interstice between the coupling disk 36 and the two electromagnets 18, 20; 18, 22, with its brake lining 34 against the coupling disk 36. The armature and coupling disks 28, 36 are joined together in a manner fixed against relative rotation by the contact pressure force of the helical compression spring 26 because of frictional engagement; that is, the armature disk 28 which is fixed against relative rotation in the housing 12 keeps the coupling disk 36 in a manner fixed against relative rotation in the housing 12. Since in the braking position, there is an axial air gap, between the magnet core 18 and the armature disk 28, that weakens a magnet field exerted by the permanent magnet 16 onto the armature disk 28 via the magnet core 18, the force of the helical compression spring 26 is greater than the magnetic force exerted on the armature disk 28 by the permanent magnet 16; that is, the helical compression spring 26 presses the armature disk 28 against the coupling disk 36, counter to the magnetic force of the permanent magnet 16.

For switching the magnetic brake 10 over to the released position, one of the two magnet coils 20, 22 is supplied with current in such a way that it increases the magnetic field of the permanent magnet 16, specifically so markedly that the magnetic force is greater than the force of the helical compression spring 26, so that the armature disk 28 is attracted to the magnet core 18 counter to the force of the helical compression spring 24. As a result, the brake lining 34 is lifted from the coupling disk 36, and the coupling disk 36 is freely rotatable. After the switchover to the released position, the current through the magnet coil 20, 22 is turned off again. Since in the released position of the magnetic brake 10 the armature disk 28 rests directly on the face end of the magnet core 18, so that there is no longer any air gap, the magnetic force exerted by the permanent magnet 16 via the magnet core 18 suffices to keep the armature disk 28 in contact with the magnet core 18, counter to the force of the helical compression spring 26. Accordingly, when it is without current, the magnetic brake 10 remains in its released position. The magnetic circuit is closed by the magnet core 18 via the armature disk 28, contacting in the released position of the magnetic brake 10, and via the housing 12.

To switch the magnetic brake 10 back into the braking position, one of the two magnet coils 20, 22 is supplied with current, now in the opposite direction, so that the magnet field generated by the magnet coil 20, 22 that is supplied with current is in the opposite direction from the magnetic field of the permanent magnet 16. In this way, the magnetic field is weakened, specifically so much that the helical compression spring 26 forces the armature disk 28 away from the permanent magnet 16 and the two electromagnets 18, 20; 18, 22 and presses it with its brake lining 34 against the coupling disk 36, and as a result the magnetic brake 10 is again in the braking position. The magnetic brake 10 can accordingly be switched over from the braking position into the released position by a brief current pulse through one of its two magnet coils 20, 22, and can be switched back from the released position to the braking position by a current pulse of opposite polarity. When it is without current, the magnetic brake 10 stays either in the braking position or in the released position.

The two magnet coils 20, 22 are connected to mutually independent power supplies, not shown in the drawing. If one of its two electromagnets 18, 20; 18, 22 or one of the two mutually independent power supplies for the electromagnets 18, 20; 18, 22 fails, the magnetic brake 10 can accordingly still always be switched over; as a consequence, it has high operational reliability.

The housing 12, on its open face end, has a screw flange 40, which is integral with the housing 12 and has screw holes 42, and with which the magnetic brake 10 can be flanged, for instance to an electric motor, not shown in FIG. 1, or other device, with a shaft 38 that is meant to be locked intermittently.

FIG. 2 shows an electromechanical wheel braking device 44 according to the invention, which is embodied as a disk brake and which can be locked with the magnetic brake 10 shown in FIG. 1 and described above. The wheel braking device 44 has a floating caliper 46, in which a pair of friction brake linings 48 are mounted on both sides of a brake disk 50 that can be set into rotation between them.

For pressing one of the two brake linings 48 against the brake disk 50, the wheel braking device 44 of the invention has a spindle drive 52, which is built into its floating caliper 46. For the sake of low friction and high efficiency, the spindle drive 52 is embodied as a rolling-contact thread drive in the form of a roller thread drive. It has a threaded spindle 56, resting coaxially in a spindle nut 54, and eight profile rollers 58, which are disposed in an interstice between the spindle nut 54 and the threaded spindle 56. The profile rollers 58 have profiling extending around the circumference, which has a form that is complimentary to a profile of a nut thread 60 of the spindle nut 54 and to a threaded profile 62 of the threaded spindle 56 that matches the threaded profile of the nut thread 60. The profiling around the circumference of the profile rollers 58 has no pitch. In a departure from the exemplary embodiment shown, however, it is also possible (not shown) to embody the profile rollers 58 with profiling with a pitch, or in other words with a thread. With their profiling, the profile rollers 58 engage both the nut thread 60 and the spindle thread 62. Driving the spindle nut 54 to rotate drives the profile rollers 58 to execute an orbiting motion about the threaded spindle 56, like planet wheels of a planetary gear. During their orbiting motion, the profile rollers 58 roll along the spindle thread 62; during the orbiting motion about the threaded spindle 56, they execute a rotational motion about their own axis. By way of the orbiting profile rollers 58, a rotational drive of the spindle nut 54 brings about a translational motion of the threaded spindle 56 in the axial direction.

The spindle drive 52 is embodied in non-self-locking fashion; that is, a thread pitch of the spindle thread 62 and of the nut thread 60 is selected to be so great that a force, acting in the axial direction on the threaded spindle 56, sets the spindle nut 54 to rotation and displaces the threaded spindle 56 axially.

The spindle nut 54 is supported rotatably in the floating caliper 46 by a pair of axial angular roller bearings 70 and is braced axially on the floating caliper 46 via the angular roller bearings 70.

For rotationally driving the spindle nut 54, the wheel braking device 44 of the invention has an electric motor 64, which is flanged to the floating caliper 46 at a right angle to the spindle drive 52. The electric motor 64 drives the spindle nut 64 via a bevel gear system 66, 68, which has a plate gear wheel 66, press-fitted onto the spindle nut 54 in a manner fixed against relative rotation, meshing with which is a bevel gear wheel 68 that is press-fitted onto a shaft 38 of the electric motor 64 in a manner fixed against relative rotation. The electric motor 64 is embodied as an electronically commutatable motor.

The threaded spindle 56 is integral with a brake lining plate 72, which is embodied on a face end of the threaded spindle 56 toward the brake disk 50. The brake lining plate 72 has a groove, not visible in the drawing, which is engaged by a spline 74 that is integral with the floating caliper 46. In this way, the threaded spindle 56 is held in the floating caliper 46 in a manner secure against relative rotation. One of the two friction brake linings 48 is mounted fixedly on the brake lining plate 72 of the threaded spindle 56. The other friction lining 48 rests in the floating caliper 46 in a manner known per se.

The magnetic brake 10 is mounted on the electric motor 64 on a face end remote from the spindle drive 52. It is screwed to the electric motor 64 by means of screws 76 that are inserted through its screw flange 40. The shaft 38 of the electric motor 64 protrudes from the electric motor 64 on both sides. On a side of the electric motor 64 remote from the floating caliper 46, the coupling disk 36 of the magnetic brake 10 is press-fitted onto the shaft 38 of the electric motor 64 in a manner fixed against relative rotation.

The function of the wheel braking device 44 of the invention is as follows: For actuation, the spindle nut 54 is driven by the electric motor 64 to rotate in an actuating direction of rotation, so that the threaded spindle 56 is displaced translationally, axially in the direction of the brake disk 50. The spline 74 of the floating caliper 46 prevents any rotation of the threaded spindle 56. The threaded spindle 56 presses the friction brake lining 48, mounted on its brake lining plate 72, against one side of the brake disk 50. Via a reaction force, the second wheel brake lining 48 is pressed against the other side of the brake disk 50 in a manner known per se via the floating caliper 46. The brake disk 50 is braked, and a braking force or braking moment is proportional to the driving moment brought to bear by the electric motor 64.

To release the wheel braking device 44 or to reduce the braking force, the spindle nut 54 is driven in the opposite, restoring direction of rotation, and as a result the threaded spindle 56 is moved translationally away from the brake disk 50. The friction wheel lining mounted on its brake lining plate 72 is lifted from the brake disk 50. The threaded spindle 56 is restored far enough that a gap between the friction wheel linings 48 and the brake disk 50, which gap remains regardless of any wear of the friction brake linings 48, exists when the wheel braking device 44 is not actuated; the so-called "air play" of the wheel braking device 44 of the invention remains constant.

During the actuation and release of the wheel braking device 44, the magnetic brake 10 is in its released position, so that the shaft 38 of the electric motor 64 is freely rotatable. When the wheel braking device 44 is used as a parking brake, the wheel braking device 44 is actuated, so that the brake disk 50 is held in a manner fixed against relative rotation between the friction brake linings 48. Next, by supplying current to one of its two electromagnets 18, 20; 18, 22, the magnetic brake 10 is switched over into its braking position, and in this way the shaft 38 of the electric motor 64 is blocked, and as a result the wheel braking device 44 is locked, and the braking force once brought to bear is maintained while the electric motor 64 and the magnetic brake 10 are without current. Also, when the wheel braking device 44 is used as a service brake, if a braking force exerted on the brake disk 50 is temporarily kept constant, this can be done by providing that after the braking force is brought to bear, the magnetic brake 10 is switched over to its braking position with the electric motor 64; all that is required is a brief current pulse to one of its two electromagnets 18, 20; 18, 22. The braking force is as a result kept constant without supplying current to the electric motor 64 and without supplying current to the magnetic brake 10. For varying the braking force, the magnetic brake 10 is switched over to its released position. In this way, the electric motor 64 is supplied with current only in order to vary the braking force and in particular in order to increase the braking force. On the one hand, this saves energy and relieves an on-board electrical system of a vehicle that can be braked with the wheel braking device 44. On the other, hand heating of the electric motor 64 is reduced, since the electric motor is supplied with current only for varying the braking force but when the braking force is being kept constant is currentless. Hence there is less of a load on the electric motor 64, and accordingly a less powerful and thus smaller, lighter electric motor 64 can be used.

In the case of a defect, that is, if an electronic control system of the electric motor 64, its power supply, or the electric motor 64 itself fails, the magnetic brake 10 is switched to its released position, so that the shaft 38 of the electric motor 64 is freely rotatable. As a result, the threaded nut 54 is also freely rotatable. The threaded spindle 56 is forced axially away from the brake disk 50 by the friction brake lining 48 pressed against the brake disk 50, and since the spindle drive 52 is non-self-locking, the threaded spindle sets the spindle nut 54 into rotation. The wheel braking device 44 is released, until the contact pressure force of the friction brake linings 48 against the brake disk is so slight that the threaded spindle 56 does not move any further, because of internal friction of the spindle drive 52, the bevel gear system 66, 68, and the electric motor 64. The friction brake linings 48 rest on the brake disk 50 with a negligible residual force that is so slight that the brake disk 50 is virtually freely rotatable, and a motor vehicle equipped with the wheel braking device 10 can be driven without causing overheating of the wheel braking device 44. It is understood that the magnetic brake 10 can be disposed at some other point in the wheel braking device 44 instead, and can for instance lock the spindle nut 54 in a directly releasable way (not shown).

The foregoing relates to preferred exemplary embodiments of the invention, it being understood that other variants and embodiments thereof are possible within the spirit and scope of the invention, the latter being defined by the appended claims.

We claim:

1. In an electromechanical wheel braking device (44) for a motor vehicle, having an electric motor (64), a non-self-locking actuating device (52, 66, 68) which is drivable by the electric motor (64) and which converts a rotating driving motion of the electric motor (64) into a translational motion, a friction brake lining (48), which can be pressed against a brake body (50), connected to a vehicle wheel in a manner fixed against relative rotation, by driving the actuating device (52, 66, 68) by means of the electric motor (64) of the actuating device (52, 66, 68), an electromechanical braking device (44) for the electric motor (64) and thus the wheel braking device (44), comprising:

a magnetic brake (10), which has a first electromagnet (18, 20) for its actuation and de-actuation, wherein the brake has two stable positions, a braking position and a non-braking position, wherein, in its braking position it brakes the electric motor (64), and in its non-braking position it allows the electric motor (64) to turn, a first power supply for the first electromagnet which supplies the first electromagnet with current of either of two polarities, wherein current of one polarity causes the brake to move to its braking position, and current of the second polarity moves the brake to its non-braking position, the magnetic brake (10) also including a second electromagnet (18, 22) which functions independently of the first electromagnet (18, 20), to also position the brake in either of its braking or non-braking positions, and a second power supply which supplies current to the second electromagnet (18, 22) with current of either of two polarities, wherein current of one polarity causes the brake to move to its braking position, and current of the second polarity causes the brake to move to its non-braking position.

2. The electromechanical wheel braking device of claim 1, wherein the actuating device (52, 66, 68) has a non-self-locking spindle drive (52).

3. The electromechanical wheel braking device of claim 2, wherein the spindle drive (52) is embodied as a rolling-contact thread drive.

4. An electromechanical wheel braking device (44) for a motor vehicle, having an electric motor (64), a non-self-locking actuating device (52, 66, 68) which is drivable by the electric motor (64) and which converts a rotating driving motion of the electric motor (64) into a translational motion, a friction brake lining (48), which can be pressed against a brake body (50), connected to a vehicle wheel in a manner fixed against relative rotation, by driving the actuating device (52, 66, 68) by means of the electric motor (64) of the actuating device (52, 66, 68), and a magnetic brake (10), which has a first electromagnet (18, 20) for its actuation, and by means of the magnetic brake (10), the electric motor (64) and thus the actuating device (52, 66, 68) can be locked in any position, the improvement wherein the magnetic brake (10) also includes a second electromagnet (18, 22) which can actuate the magnetic brake entirely independently of the first electromagnet (18, 20), and the first and second electromagnets (18, 20; 18, 22) are connected to mutually independent power supplies and wherein the magnetic brake (10) is embodied in bistable form.

5. The electromechanical wheel braking device of claim 4, wherein the actuating device (52, 66, 68) has a non-self-locking spindle drive (52).

6. The electromechanical wheel braking device of claim 5, wherein the spindle drive (52) is embodied as a rolling-contact thread drive.

* * * * *